Patented Dec. 31, 1929

1,741,418

UNITED STATES PATENT OFFICE

KENNETH H. HOOVER, OF BUFFALO, NEW YORK, ASSIGNOR TO NATIONAL ANILINE & CHEMICAL CO., INC., OF NEW YORK, N. Y., A CORPORATION OF NEW YORK

MONAZO PYRAZOLONE DYE

No Drawing.  Application filed October 9, 1925. Serial No. 61,589.

This invention relates to the production of new monazo pyrazolone dyes which are of value for dyeing wool and other material, as well as for the formation of valuable lakes or pigments. Material dyed or printed with the new dyestuffs also form a part of the present invention.

The new dyes may be obtained by coupling one molecular proportion of the diazo compound derived from an orthoaminonaphthol sulfonic acid, more particularly the 1.2 and 2.1-aminonaphthol sulfonic acids, and especially 1.2-aminonaphthol-4-sulfonic acid, with one molecular proportion of a 1-(3'-sulfophenyl)-5-pyrazolone capable of combining in position four and which may contain halogen substituted in the phenyl nucleus.

The new dyestuffs thus obtained correspond with the general formula

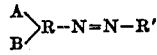

wherein R signifies a 1-(3'-sulfophenyl)-3 methyl or carboxyl-5-pyrazolone nucleu combined in position four with the azo bridge, A and B each denote a hydrogen or halogen atom attached to the phenyl nucleus, and R' represents a sulfonated naphthyl nucleus which contains a hydroxyl group in ortho position to the azo group. The new dyestuffs form orange to brown powders soluble in water giving orange-yellow to reddish-brown solutions which on boiling with zinc dust give violet colorations, and are soluble in concentrated sulfuric acid giving yellowish-red to red solutions which on dilution with ice change to various shades of orange. They dye wool from an acid bath various shades of brown which on after-chroming change to yellowish-red to bluish-red tints of excellent fastness to light, washing, fulling and potting. In dyeing wool interwoven with silk, the silk is stained very little, if at all.

The following specific example will further illustrate the invention, but it is understood that the invention is not limited thereto. The parts are by weight.

*Example.*—50 parts (one mol) of the dry sodium salt of the diazo compound of 1.2-aminonaphthol-4-sulfonic acid are slowly introduced into a well-stirred solution at a temperature of 20°–25° C. of 55.5 parts (in slight excess of one mol) of the sodium salt of 1-(3'-sulfophenyl)-3-methyl-5-pyrazolone in 1000 parts water containing a sufficient quantity of sodium carbonate to maintain an alkaline reaction throughout the combination. When the combination is completed, which requires a few hours, the solution is heated to about 60°–65° C., acidified by the addition of a slight excess of hydrochloric acid, and salted out by the addition of common salt, cooled to about 40° C., and then filtered off, pressed and dried in the usual manner.

The product thus obtained and which corresponds with the probable formula

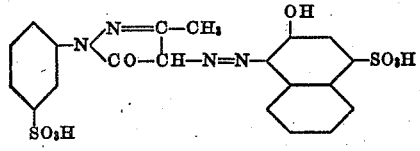

forms a reddish-brown powder soluble in water giving an orange colored solution which on boiling with zinc dust produces a violet coloration, and soluble in concentrated sulfuric acid giving a brownish-red solution which on dilution with ice changes to an orange. It dyes wool from an acid bath yellowish-brown shades which on after-chroming change to bluish-red tints which are of excellent fastness to light, washing, fulling and potting. In dyeing wool interwoven with silk, the silk is only slightly stained.

If, in this example, 1-(2'-chlor-5'-sulfophenyl)-3-methyl-5-pyrazolone be substituted in equivalent quantity for the 1-(3'-sulfophenyl)-3-methyl-5-pyrazolone, there is obtained a brownish powder which dyes wool in an acid bath yellowish-brown shades which by after-chroming are converted into yellowish-blue red tints.

In an analogous manner, other valuable monazo pyrazolone dyes are produced by combining the same or another diazotized o-aminonaphthol sulfonic acid, for example, 1.2-aminonaphthol-6-sulfonic acid, 1.2-aminonaphthol-3.6-disulfonic acid, 2.1-aminonaphthol-4-sulfonic acid, etc., on the one hand and the same or another 1-(3'-sulfophenyl)-5-pyrazolone, for example, a 1-(2'.5'-dichlor-3'-sulfophenyl)-5-pyrazolone, etc., on the other hand.

It will be understood that the pyrazolones contemplated in the present invention carry a methyl or a carboxyl group in the 3-position of the pyrazolone nucleus except where otherwise specified, and are capable of combining with diazo compounds in the 4-position.

I claim:

1. As new products, the monazo pyrazolone dyestuffs which correspond with the following probable formula

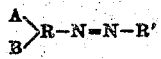

wherein R signifies a 1-(3'-sulfophenyl)-3-methyl or carboxyl-5-pyrazolone, A and B each denote a hydrogen or a halogen atom attached to the phenyl nucleus, and R' represents a sulfonated naphthalene nucleus which contains a hydroxyl group in an ortho position to the azo bridge.

2. As new products, the monazo pyrazolone dyestuffs which correspond with the probable formula

wherein R signifies a 1-(3'-sulfophenyl)-3-methyl or carboxyl-5-pyrazolone, A and B each denote a hydrogen or a chlorine atom attached to the phenyl nucleus, and R' denotes a monosulfonated naphthalene nucleus which contains a hydroxyl group in ortho position to the azo bridge.

3. As new products, the monazo pyrazolone dyestuffs which correspond with the probable formula

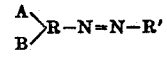

wherein R signifies a 1-(3'-sulfophenyl)-3-methyl or carboxyl-5-pyrazolone, A and B each denote a hydrogen or a halogen atom in the phenyl nucleus, and R' denotes a sulfonated naphthalene nucleus which contains a hydroxyl group in the ortho position to the azo bridge, said hydroxyl group adhering to one of the positions 1 and 2 in the naphthalene nucleus and the azo bridge adhering to the other position.

4. As new products, the monazo pyrazolone dyes which correspond with the probable formula

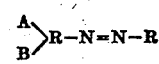

wherein R signifies a 1-(3'-sulfophenyl)-3-methyl or carboxyl-5-pyrazolone, A and B each denote a hydrogen or a halogen atom in the phenyl nucleus, and R' a sulfonated 2-hydroxynaphthalene nucleus where the azo bridge adheres to the 1-position of the naphthalene nucleus.

5. As new products, the monazo pyrazolone dyestuffs which correspond with the probable formula

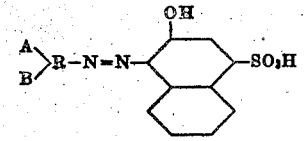

wherein R signifies a 1-(3'-sulfophenyl)-3-methyl or carboxyl-5-pyrazolone, and A and B each denote a hydrogen or chlorine atom in the phenyl nucleus.

6. As new products, the monazo pyrazolone dye stuffs which correspond with the probable formula

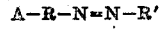

wherein R signifies a 1-(3'-sulfophenyl)-3-methyl or carboxyl-5-pyrazolone, A denotes a hydrogen or a halogen atom in the phenyl nucleus, and R' a sulfonated naphthalene nucleus which contains a hydroxyl group in an ortho position to the azo bridge.

7. As new products, the monazo pyrazolone dyestuffs which correspond with the probable formula

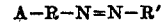

wherein R signifies a 1-(3'-sulfophenyl)-3-methyl or carboxyl-5-pyrazolone, A denotes a hydrogen or a halogen atom in the phenyl nucleus, and R' a sulfonated naphthalene nucleus which contains a hydroxyl group in ortho position to the azo bridge, said hydroxyl group adhering to one of the positions 1 and 2 in the naphthalene nucleus and the azo bridge adhering to the other position.

8. As new products, the monazo pyrazolone dyestuffs which correspond with the probable formula

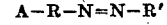

wherein R signifies a 1-(3'-sulfophenyl)-3-methyl or carboxyl-5-pyrazolone, A denotes a hydrogen or a chlorine atom in the phenyl nucleus, and R' a sulfonated 2-hydroxynaphthalene nucleus where the azo bridge adheres to the 1-position of the naphthalene nucleus.

9. As new products, the monazo pyrazolon dyestuffs which correspond with the probable formula

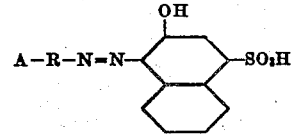

wherein R signifies a 1-(3'-sulfophenyl)-3-methyl or carboxyl-5-pyrazolone and A denotes a hydrogen or a chlorine atom attached to the phenyl nucleus.

10. As new dyestuffs, the monazo pyrazolone dyestuffs which correspond to the probable formula

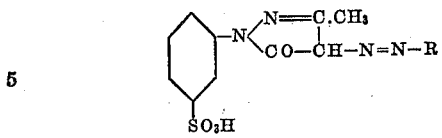

wherein R denotes a monosulfonated naphthalene nucleus which contains a hydroxyl group in ortho position to the azo bridge which adheres to the 1-position.

11. As a new product, the monazo pyrazolone dyestuff which corresponds with the probable formula

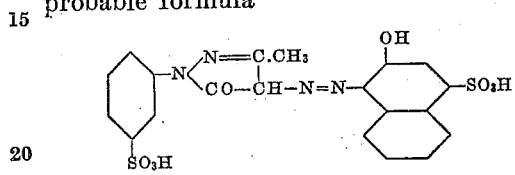

12. As new products, the monazo pyrazolone dyestuffs which correspond with the probable formula

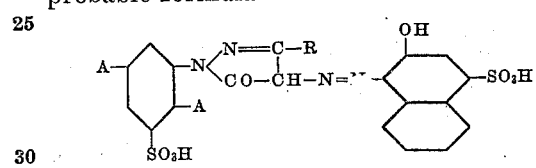

wherein A denotes a hydrogen or a halogen atom, and R denotes a methyl or a carboxyl group.

13. As new products, the monazo pyrazolone dyestuffs which correspond with the probable formula

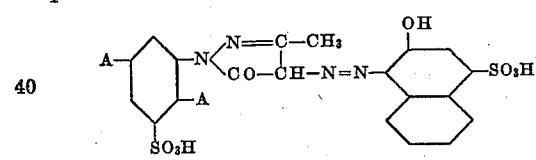

wherein A denotes a hydrogen or chlorine atom.

14. Material dyed with a dyestuff of claim 1.
15. Material dyed with a dyestuff of claim 2.
16. Material dyed with a dyestuff of claim 3.
17. Material dyed with a dyestuff of claim 4.
18. Material dyed with a dyestuff of claim 5.
19. Material dyed with a dyestuff of claim 6.
20. Material dyed with a dyestuff of claim 7.
21. Material dyed with a dyestuff of claim 8.
22. Material dyed with a dyestuff of claim 9.
23. Material dyed with a dyestuff of claim 10.
24. Material dyed with the dyestuff of claim 11.
25. Material dyed with the dyestuff of claim 12.
26. Material dyed with the dyestuff of claim 13.

In testimony whereof I affix my signature.

KENNETH H. HOOVER.